Nov. 30, 1937.  E. L. BUTLER ET AL  2,100,430
MANUFACTURE OF SOLES
Filed Jan. 16, 1936
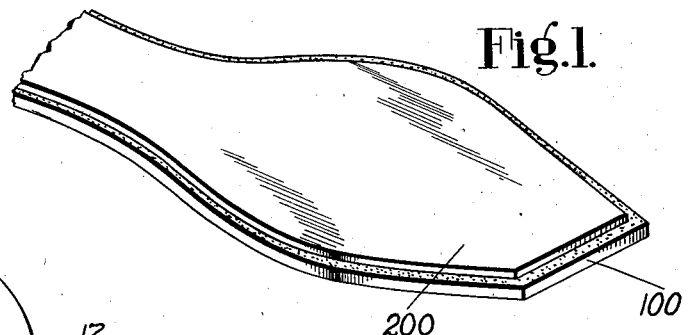
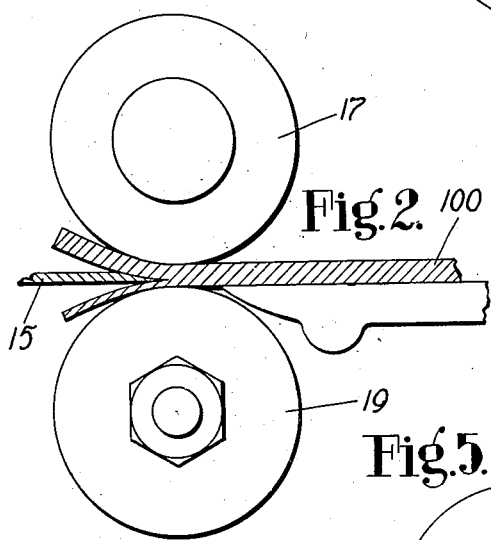
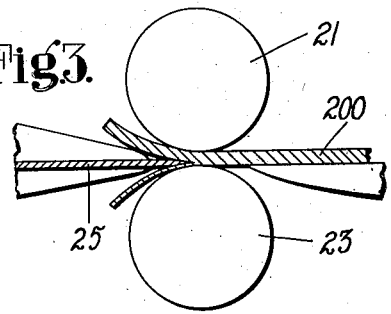
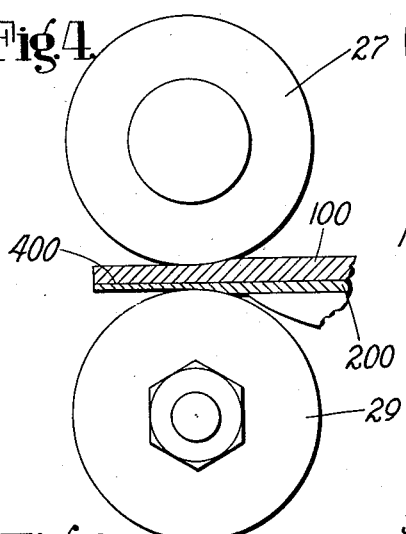
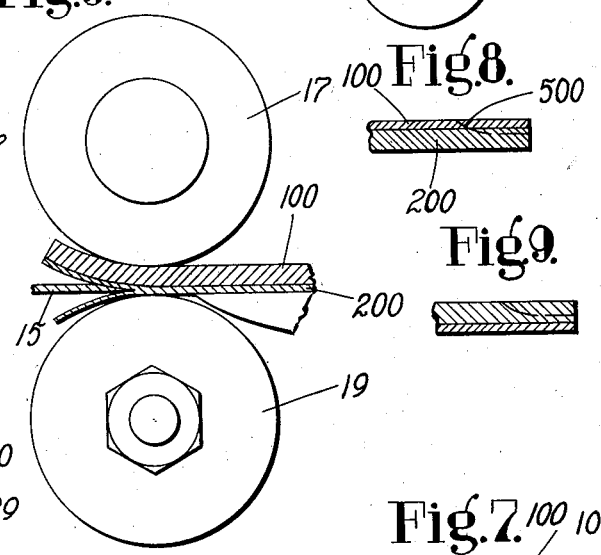
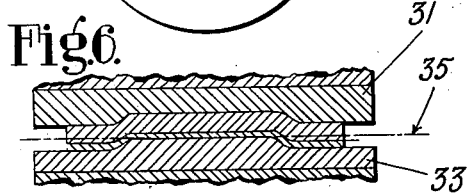
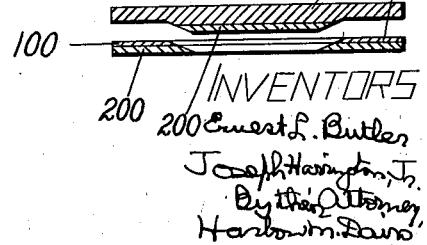
INVENTORS
Ernest L. Butler
Joseph Harrington, Jr.
By their Attorney
Harrison M. Davis Patented Nov. 30, 1937

2,100,430

UNITED STATES PATENT OFFICE 2,100,430

MANUFACTURE OF SOLES

Ernest Lindon Butler, Lynn, and Joseph Harrington, Jr., Wenham, Mass., assignors to United Shoe Machinery Corporation, Paterson, N. J., a corporation of New Jersey Application January 16, 1936, Serial No. 59,442

7 Claims. (Cl. 12—146)

This invention relates to the manufacture from a laminated blank of a sole and an insole for a shoe and is herein illustrated as embodied in the manufacture of an insole and outsole having complementary forepart portions of certain shapes.

In the manufacture of shoes of a certain type it is customary to form from a solid leather sole blank a so-called "insole-outsole combination" consisting of a sole having a projection in its forepart and an insole having a correspondingly located complementary recess or opening. This practice necessitates the use of a heavy sole leather blank of a superior quality and of a thickness equal to the combined thicknesses of the outsole and the insole which are to be made from it. Sole leather of such quality and thickness is expensive; and it is among the objects of the present invention to permit the use of less expensive material by a novel method involving the use of laminated blanks.

The insole-outsole combination which has been referred to above may be used in two types of shoes in one of which, for example Goodyear welt shoes, the insole is channeled, and in the other of which, for example shoes the soles of which are attached by cement, the insole is not channeled. In either case, in order that the subsequent cut shall divide the laminated blank into a satisfactory insole and outsole, it is desirable that the laminated blank should be of substantially uniform thickness throughout and that the cement joint between the layers should be substantially parallel to the surfaces of the layers, a somewhat greater degree of accuracy being desirable in case the insole is subsequently to be channeled than in the case in which it is not. Moreover, the machine commonly used to divide the blanks into insoles and outsoles is a matrix-roll type of splitting machine in which the matrix roll has two matrices located side by side so that two blanks at a time may put through the machine. Here again is a condition which calls for blanks of substantially uniform thickness throughout, as well as of substantially the same thickness in the case of any two blanks which are to be put through the machine together, since if one of the two is sufficiently thicker than the other, only the thicker blank will be properly gripped and divided.

The present invention comprises assembling an evened outsole blank and an insole blank in superposed relation with an adhesive substance between them, compressing the laminated blank, dividing it into the desired insole-outsole combination and channeling the insole if desired. Preferably, and particularly in the case in which the insole is to be channeled, the outsole blank is evened by means of a leather splitting or evening machine; and the insole blank is likewise evened in the same manner if the insole blank is of leather. If, however, this latter blank is made of one of the well-known fabricated materials and is substantially even, that is, of substantially uniform thickness throughout, no evening of it may be necessary. Machines for evening leather by removing a skiving from it do not produce strictly accurate results, there being always an error of some magnitude; and there is liable to be a small error in the production of fabricated material. Moreover, these errors may be added to each other in the laminated blank when the outsole blank is superposed on the insole blank. It is because of this, as well as to bond the blanks firmly together, that the laminated blank is subjected to pressure, the pressure being of sufficient magnitude to remove substantially all the unevenness which would otherwise be present, or at least to reduce the unevenness to a magnitude such that the subsequent dividing of the laminated blank into the desired insole-outsole combination can be accomplished satisfactorily. The laminated blank thus made is then divided into the desired insole-outsole combination preferably by means of a splitting machine of the matrix-roll type, and the insole is thereafter channeled if desired.

Referring to the accompanying drawing,

Fig. 1 is a perspective of an insole and an outsole in superposed relation with an adhesive substance between them;

Fig. 2 is a view partly in section and partly in elevation of parts of a fixed-knife splitting machine showing an outsole in process of being evened;

Fig. 3 is a similar view of parts of a belt-knife splitting machine showing an insole in process of being evened;

Fig. 4 is a similar view of parts of a rolling machine showing a laminated blank in process of being compressed;

Fig. 5 is a view of the same parts of a fixed-knife splitting machine which are shown in Fig. 2, but with the machine in process of evening a laminated blank;

Fig. 6 is a cross-section of parts of the matrix and patrix rolls of a machine in process of splitting a laminated blank into the desired insole-out combination;

Fig. 7 is a cross-section of the insole and outsole which results when the splitting cut takes place along the dot-and-dash line of Fig. 6;

Fig. 8 is a cross-section on an enlarged scale of a portion of a channeled insole, the cut produced by one of the channeling knives extending through the facing of outsole material; and Fig. 9 is a similar cross-section also on an enlarged scale in which neither of the channeling cuts extends through the facing of outsole material.

In the preferred procedure in which the method may be practiced, a sole blank 100 is evened, for example by being passed through a splitting machine having a fixed knife 15 and the usual gage and feed rolls 17, 19, the gage roll 17 being adjustable vertically but held from upward movement during the splitting operation, and the feed roll 19 being downwardly yieldable under heavy spring pressure, such a machine being shown in United States Letters Patent No. 894,850, granted August 4, 1908, on an application filed in the name of Fred J. Nash. If a leather insole blank 200 is to be employed, it is evened preferably by means of a splitting or evening machine having the usual gage and feed rolls 21, 23, and a belt knife 25, a machine of this type being shown in United States Letters Patent No. 1,382,755, granted June 28, 1921, upon an application filed in the name of William C. Baxter. The faces of the two evened blanks which are to be in contact with each other are coated with an adhesive substance such as rubber latex, and the blanks are assembled in superposed relation as shown in Fig. 1 with the adhesive substance between them. It is necessary to press them together in order to cause a firm bond to be formed between them, but a heavy pressure sufficient to compress the blank considerably is desirable for another reason.

The laminated blank after having been rounded is to be split into the desired insole-outsole combination by means of a splitting machine provided with a knife and properly shaped matrix and patrix rolls in a manner which will be described more in detail later, the major portion of the cut of the knife being caused to take place either in the outsole blank close to the plane of adhesion of the two blanks so that a very thin facing of outsole material adheres to the insole or in said plane. If the major portion of the cut,—that is substantially all of it except that portion which forms the recess or opening in the forepart of the insole and the corresponding projection on the forepart of the outsole—is to take place in the outsole blank, it is desirable that the knife, in making the cut, should not enter the plane of adhesion since, if it does enter this plane, there is a strong tendency for it to remain there; and, when it does leave this plane, it is liable to make a ragged cut. On the other hand, if the layers of the laminated blank are to be split apart for the most part in the plane of adhesion of the blanks, obviously it is desirable that the knife should not leave this plane. For these reasons, it is desirable that the laminated blank ready to be split should be as even—that is of as nearly a uniform thickness throughout—as possible. In general, when an insole which must later be channeled is to be produced, it is desirable that the variation from uniformity should not be greater than ±.003 of an inch. This means that the difference in thickness between the thickest and the thinnest spot should not be greater than .006 of an inch. The constant error of a fixed-knife splitting or evening machine, when operating upon leather outsoles, is ordinarily about ±.008 of an inch, and that of a belt-knife splitting or evening machine, when operating upon leather insoles, is about ±.003 of an inch. These figures are of course approximate and vary with the degree of sharpness of the knife and the quality of the leather. When an evened outsole blank and an evened insole blank are superposed, the errors in the two are liable to be added so that if, for example, the outsole blank had a difference of .016 of an inch between the thickness of its thinnest spot and that of its thickest spot, and the insole blank had a difference of .006 of an inch, the resulting laminated blank might have a difference of .022 or ±.011 of an inch. Because of the constant error in the operation of the splitting machines in evening the two blanks and the chances that these errors will be added together in the laminated blank, the present method includes the use of a pressure which is sufficient to compress the laminated blank considerably. The material of which this blank is made, whether it consists wholly of leather or whether it consists in part of fabricated material, has of course a limit of elasticity, and if sufficient pressure is applied to it to exceed this limit, a permanant set will result. In the present case, the blank should be compressed throughout to such an extent that it is compressed at its thinnest locality beyond the limit of elasticity. The variation in thickness of the laminated blank before being compressed in this manner is not great being, as has been explained, ordinarily not more than ±.011 of an inch. For example, the thickest spot may measure .172 of an inch and the thinnest .150 of an inch, the difference between these two being .022 of an inch. If now, for example, the blank is passed between two rollers so adjusted that a permanent set of say .023 of an inch (which is greater than this difference) is imparted to all portions of the blank, its thickness will be uniform. And even if a smaller permanent set is imparted to it, it can be evened to within the desired ±.003 of an inch. It will be understood that the specific figures given above have been used principally for the purpose of simplifying the explanation of what takes place and are not to be considered as limitations.

The laminated blank with the adhesive substance between its layers is compressed preferably by being passed through a rolling machine having two driven rolls 27, 29 one of which is adjustable toward and from the other, the axes of the rolls being held in fixed positions during the rolling operation. A suitable machine may be provided by making simple changes in the splitting machine of the Nash patent, said changes consisting in removing the knife and in jacking up the bearings of the lower roll so that the lower roll can not yield downward. The upper roll, as has been explained, is adjustable vertically but is held from yielding upward. Before the laminated blank is put through the machine, the upper roll is adjusted into such a position that the thinnest locality of the blank will be compressed beyond the limit of elasticity of that locality and a permanent set will therefore be imparted to the whole blank.

Before the laminated blank is split into the desired insole-outsole combination, it is rounded to approximately final shape, for example by means of a machine such as that disclosed in United States application Serial No. 734,650, filed July 11, 1934, in the name of Fred E. Bertrand. The splitting of the laminated blank so as to divide it into the desired insole-outsole combination may be performed conveniently by a machine such as that shown in United States application Serial No. 13,716, filed March 29, 1935, in the name of Charles E. Hood. This machine comprises a matrix roll 31, a patrix roll 33 and a knife, not shown. In Fig. 6 the matrix and patrix portions of these rolls are shown distorting the forepart of the laminated blank so that the cut of the knife will form an opening in the insole and a corresponding projection on the outsole. The rolls are shown in adjusted position to cause the cut of the knife to take place in a plane which includes the dot-and-dash line 35. The result is shown in Fig. 7 wherein it will be seen that the insole 200 has a thin facing of outsole material 100. The machine may be adjusted, if desired, to cause the major part of the cut of the knife to take place in the plane of adhesion between the blanks, in which case no facing of outsole material will be provided on the insole; or it may be so adjusted as to cause the major portion of the cut to take place in the insole layer.

One procedure by which a suitable insole-outsole combination may be made has been described above, said procedure varying slightly according to whether the insole blank is made of leather or of some fabricated material. Another procedure by which an insole-outsole combination may be made according to the present method is to even the outsole blank as before, for example by a splitting machine in the manner shown in Fig. 2, then to superpose this outsole blank upon an unevened leather insole blank, then to assemble the two blanks in superposed relation with an adhesive substance between them, then to compress the laminated blank, and finally to even the laminated blank by removing material from the insole portion, for example in the manner shown in Fig. 5, by putting the laminated blank through the same machine shown in Fig. 2, but with the upper roll adjusted into a position a little farther from the lower roll. In this procedure the laminated blank, just prior to being divided into the insole-outsole combination, has been subjected to an evening operation performed by a splitting machine and may therefore vary somewhat in thickness for the reasons which have been explained above. Such variation as will ordinarily occur, however, will have no deleterious effect if the insole, later to be produced, is not to be channeled, and may have no such effect if the insole is to be channeled, since the previous compression of the laminated blank renders the subsequent evening operation of the splitting machine more accurate. It should be noted that the accuracy with which a blank is evened by a splitting machine depends to a considerable extent upon the quality of the material of which the blank is made, the accuracy increasing with the firmness and uniformity of density of the material.

In case the insole is to be channeled, this operation may be accomplished in any suitable manner, for example by a machine such as that shown in United States Letters Patent No. 952,701, granted March 22, 1910, upon an application filed in the name of Andrew Eppler. The channeling cuts may be differently located as may be desired. In Fig. 8 there is shown a portion of a leather or fabricated insole in which one of the channel cuts 500 extends through the facing of outsole material 100. In Fig. 9 there is shown a portion of a similar insole which has been channeled on the opposite face and in which neither of the channel cuts extends through the facing of outsole material.

It will be noted that the laminated insole shown in Fig. 8 comprises a ply of outsole material 100 and a ply of insole material 200, that the inside channel cut 500 extends through the ply of outsole material into the insole material and that the edge slit extends into the insole material. There are thus formed two two-ply lips each consisting of a ply of outsole material and a ply of insole material, which may be subsequently raised and cemented together in the usual manner to form a sewing rib.

It will be clear that variations in the procedure whereby the method is practiced may be employed, the term "evening the blank" as used broadly in the claims being intended to cover any procedure such as splitting, abrading or compressing, which reduces the inequalities in the thickness of the blank.

Although the insole 200 has been shown as having an opening which extends completely through it, it should be understood that this opening may extend only part way through according to the adjustment of the work-engaging parts of the matrix-roll splitting machine; and the word "recess" employed in the appended claims is intended to cover broadly either form of insole.

Having thus described our invention, what we claim as new and desire to secure by Letters Patent of the United States is:—

1. That improvement in the art of making a complemental insole-outsole combination consisting of an outsole having a projection on its forepart and an insole having a correspondingly located complemental recess, which comprises removing material from an outsole blank to even it, assembling the outsole blank and an insole blank in superposed relation with an adhesive substance between them, compressing the laminated blank, removing material from the insole layer to even the laminated blank, and splitting the laminated blank into the complemental insole-outsole combination.

2. That improvement in the art of making a complemental insole-outsole combination consisting of an outsole having a projection on its forepart and an insole having a correspondingly located recess, which comprises assembling an evened outsole blank and an insole blank in superposed relation with an adhesive substance between them, compressing the laminated blank, removing material from the insole to even the laminated blank, and splitting it into the desired insole-outsole combination.

3. That improvement in the art of making a complemental insole-outsole combination consisting of an outsole having a projection on its forepart and an insole having a correspondingly located complemental recess, which comprises performing an evening operation upon an outsole blank, assembling the outsole blank and an insole blank in superposed relation with an adhesive substance between them, compressing the laminated blank sufficiently to impart a permanent set to all portions of the blank, and splitting it into the complemental insole-outsole combination.

4. That improvement in the art of making a complemental insole-outsole combination consisting of an outsole having a projection on its forepart and an insole having a correspondingly located complemental recess, which comprises performing evening operations respectively upon an outsole blank and upon an insole blank, assembling the blanks in superposed relation with an adhesive substance between them, subjecting the laminated blank to rolling pressure sufficient to impart a permanent set to all portions of the blank, and splitting it into the desired insole-outsole combination.

5. That improvement in the art of making a complemental insole-outsole combination consisting of an outsole having a projection on its forepart and an insole having a correspondingly located complemental recess, which comprises removing material from an outsole blank to even it, assembling the outsole blank and an insole blank in superposed relation with an adhesive substance between them, subjecting the laminated blank to unyielding rolling pressure sufficient to impart a permanent set to all portions of the blank, removing material from the insole layer to even the laminated blank, and splitting the laminated blank into the complemental insole-outsole combination.

6. The method of making a laminated blank adapted to be split into an outsole having a projection on its forepart and an insole having a correspondingly located complementary recess, which comprises performing an evening operation upon an outsole blank, assembling the outsole blank together with an insole blank in superposed relation with an adhesive between them, and compressing all portions of the laminated blank to such an extent that the thinnest locality is compressed beyond the limit of elasticity.

7. The method of making a laminated blank adapted to be split into an outsole having a projection on its forepart and an insole having a correspondingly located complementary recess, which comprises performing an evening operation upon an outsole blank, assembling the outsole blank together with an insole blank in superposed relation with an adhesive substance between them, and subjecting the laminated blank to rolling pressure sufficient to impart a permanent set to all portions of the blank.

ERNEST LINDON BUTLER.
JOSEPH HARRINGTON, Jr.